United States Patent
Liu et al.

(10) Patent No.: US 11,977,432 B2
(45) Date of Patent: May 7, 2024

(54) DATA PROCESSING CIRCUIT AND FAULT-MITIGATING METHOD

(71) Applicant: Skymizer Taiwan Inc., Taipei (TW)

(72) Inventors: Shu-Ming Liu, Taipei (TW); Jen-ho Kuo, Taipei (TW); Wen Li Tang, Taipei (TW); Kai-Chiang Wu, Hsinchu (TW)

(73) Assignee: Skymizer Taiwan Inc., Taipei (TW)

( * ) Notice: Subject to any disclaimer, the term of this patent is extended or adjusted under 35 U.S.C. 154(b) by 203 days.

(21) Appl. No.: 17/509,064

(22) Filed: Oct. 25, 2021

(65) Prior Publication Data
US 2022/0342736 A1 Oct. 27, 2022

(30) Foreign Application Priority Data
Apr. 22, 2021 (TW) .................. 110114593

(51) Int. Cl.
*G11C 29/00* (2006.01)
*G06F 7/50* (2006.01)
*G06F 7/523* (2006.01)
*G06F 11/07* (2006.01)
*G06N 3/04* (2023.01)

(52) U.S. Cl.
CPC .............. *G06F 11/073* (2013.01); *G06F 7/50* (2013.01); *G06F 7/523* (2013.01); *G06F 11/0763* (2013.01); *G06N 3/04* (2013.01)

(58) Field of Classification Search
CPC ...... G06F 11/073; G06F 11/0763; G06F 7/50; G06F 7/523; G06N 3/04
See application file for complete search history.

(56) References Cited

U.S. PATENT DOCUMENTS

| | | | |
|---|---|---|---|
| 5,442,579 A | * | 8/1995 | Thomson .............. G06F 7/5338 708/627 |
| 10,340,003 B1 | * | 7/2019 | Chang .................. G06F 7/5443 |
| 2020/0026498 A1 | * | 1/2020 | Sumbul .............. G06F 12/0811 |
| 2020/0364577 A1 | * | 11/2020 | Le Gallo-Bourdeau ..................... G06N 3/063 |
| 2021/0073619 A1 | * | 3/2021 | Wang ..................... G06N 3/065 |

* cited by examiner

*Primary Examiner* — Samir W Rizk
(74) *Attorney, Agent, or Firm* — JCIPRNET

(57) ABSTRACT

A data processing circuit and a fault-mitigating method are provided. In the method, multiple sub-sequences are divided from sequence data. A first sub-sequence of the sub-sequences is accessed from a memory for a multiply-accumulate (MAC) operation to obtain a first computed result. The MAC operation is performed on a second sub-sequence of the sub-sequences in the memory to obtain a second computed result. The first and the second computed results are combined, where the combined result of the first and the second computed results is related to the result of the MAC operation on the sequence data directly. Accordingly, the error rate could be reduced, so as to mitigate fault.

10 Claims, 6 Drawing Sheets

DATA PROCESSING CIRCUIT AND FAULT-MITIGATING METHOD

CROSS-REFERENCE TO RELATED APPLICATION

This application claims the priority benefit of Taiwan application serial no. 110114593, filed on Apr. 22, 2021. The entirety of the above-mentioned patent application is hereby incorporated by reference herein and made a part of this specification.

BACKGROUND

Technology Field

The disclosure relates to a data processing mechanism, and particularly, to a data processing circuit and a fault-mitigating method.

Description of Related Art

Neural Networks are one of the important topics in Artificial Intelligence (AI), and they make decisions by simulating the operation of human brain cells. Note that there are many neurons in human brain cells, and the neurons are connected to one another through synapses. Meanwhile, each neuron can receive a signal through a synapse, and the output of the transformed signal will be transmitted to another neuron. The transformation ability of each neuron is different, and human beings can form the ability to think and make an judgement through the operation of the signal transmission and transformation. The neural networks are based on the operation to obtain the corresponding ability.

A neural network is often used in image recognition, speech recognition, or data analysis. In the operation of each neuron, the input element is multiplied by the weight of the corresponding synapse (possibly added with a bias) and then passed through a nonlinear function (e.g. an activation function) to produce the output, thereby extracting features. Inevitably, the memory used to store input values, weight values, and function parameters may cause errors/damages (e.g. hard errors) to some storage blocks due to a poor yield, or other factors (e.g. unstable cell resistance, the dimension of an operation Unit (OU), or non-ideal current sensing) of computing in memory (CIM) may cause output errors, and this in turn affects the completeness or correctness of the stored data. Although an in-memory computing architecture can improve processing efficiency and power consumption, it may be accompanied by a certain error rate.

SUMMARY

In view of this, the embodiment of the disclosure provides a data processing circuit and a fault-mitigating method, which combines a Von Neumann architecture with an in-memory computing architecture to improve the error rate of all operations in the in-memory computation.

A fault-mitigating method in the embodiments of the disclosure includes (but is not limited to) the following steps. Sequence data is divided into multiple sub-sequences. A first sub-sequence of the sub-sequences is accessed from a memory to perform a multiply-accumulate (MAC) operation to obtain a first computed result. The multiply-accumulate operation is performed on a second sub-sequence of the sub-sequences in the memory to obtain a second computed result. The first computed result and the second computed result are combined, and a combined result of the first computed result and the second computed result is related to a result of the multiply-accumulate (MAC) operation on the sequence data.

A data processing circuit in the embodiments of the disclosure includes (but is not limited to) a memory, a computing unit, and a controller. The memory is adapted for storing sequence data. The controller is coupled to the memory and adapted to divide the sequence data into multiple sub-sequences. The computing unit is coupled to the memory and the controller. The controller accesses a first sub-sequence of the sub-sequences from the memory, and the computing unit performs a multiply-accumulate operation on the first sub-sequence to obtain a first computed result. The multiply-accumulate operation is performed on a second sub-sequence of the sub-sequences in the memory to obtain a second computed result. The computing unit or the memory combines the first computed result and the second computed result. A combined result of the first computed result and the second computed result is related to a result of the multiply-accumulate (MAC) operation on the sequence data directly.

Based on the above, with the data processing circuit and the fault-mitigating method in the embodiments of the disclosure, an computing unit is disposed outside the memory to perform MAC operations on part of the sub-sequences of the sequence data, so as to improve the error rate of all operations in the in-memory computation.

In order to make the aforementioned features and advantages of the disclosure comprehensible, embodiments accompanied with drawings are described in detail below.

DESCRIPTION OF THE EMBODIMENTS

Figure 1:
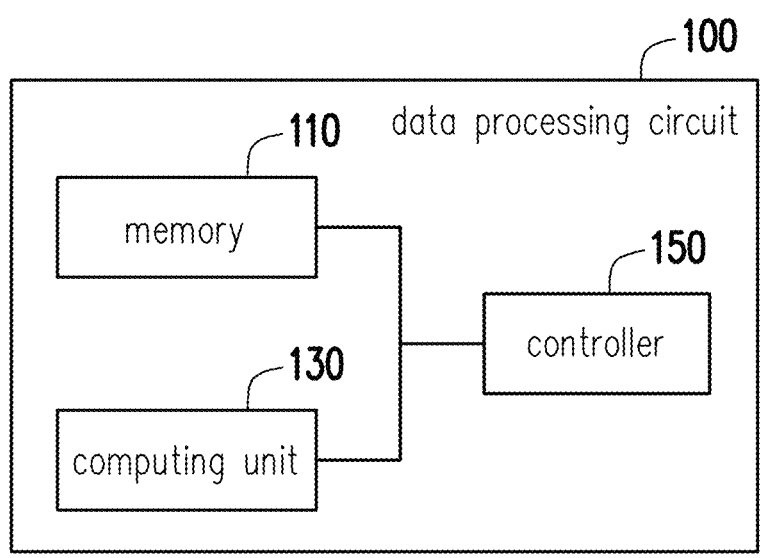
FIG. 1 is a block view of elements of a data processing circuit according to an embodiment of the disclosure.

FIG. 1 is a block view of elements of a data processing circuit 100 according to an embodiment of the disclosure. Referring to FIG. 1, the data processing circuit 100 includes (but is not limited to) a memory 110, a computing unit 130, and a controller 150.

The memory 110 may be static or dynamic random access memory (RAM), read-only memory (ROM), flash memory, a register, a combinational circuit, or a combination thereof.

In one embodiment, the memory 110 is used to store sequence data. The sequence data may be data such as images, voices, or other application data; the weight used in the multiply-accumulate (MAC) operation related to feature extraction; and/or the value used in the activation operation. In one embodiment, the user can determine the type of data stored in the memory 110 according to actual requirements.

In an embodiment, the memory 110 may be nonvolatile memory, such as phase change memory (PCM), resistive RAM (ReRAM), or magnetoresistive random access memory (MRAM); and the memory 110 can be used as a neural network accelerator. The cells of the memory 110 can perform operations such as AND, OR, and XOR, i.e., to realize in-memory computations. Taking ReRAM as an example, the voltage across the bit line (BL) of the memory cell and the source line (SL) is used as an input value (e.g. a feature value), and the weight is stored in the memory cell in a vertical manner. The total current of the cell can be accumulated in the capacitor, then the voltages on the several capacitors are converted into digital signals which are then computed, and this is the computed result of the MAC operation.

The computing unit 130 may be a circuit that performs arithmetic and logic operations and may also be a circuit or a processor composed of one or more multipliers and adders. The computing unit 130 may include an arithmetic logic unit (ALU), an accumulator, a state register, and a general register. In one embodiment, the computing unit 130 is used to perform MAC operations.

The controller 150 is coupled to the memory 110 and the computing unit 130. The controller 150 may be a circuit composed of one or more of multiplexers, adders, multipliers, encoders, decoders, or various types of logic gates; and it may be a central processing unit (CPU), other programmable general-purpose or special-purpose microprocessors, a digital signal processor (DSP), a programmable controller, an application-specific integrated circuit (ASIC), other similar elements, or a combination thereof. In one embodiment, the operation of the controller 150 can be implemented through software. In some embodiments, the computing unit 130 and the controller 150 are integrated into a single chip.

Figure 2A:
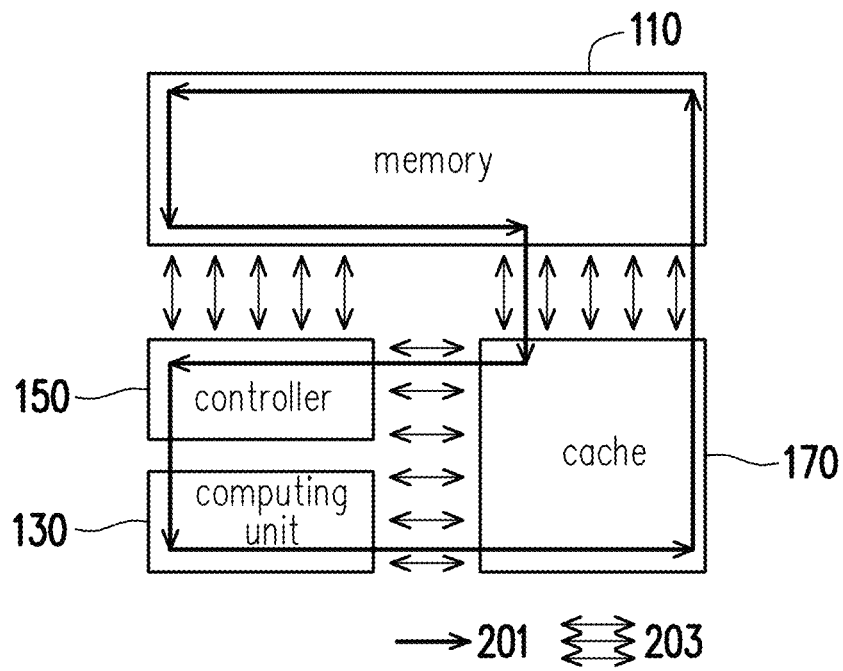
FIG. 2A is a schematic view of a Von Neumann architecture according to an embodiment of the disclosure.

In one embodiment, the data processing circuit is of von Neumann architecture. FIG. 2A is a schematic view of a Von Neumann architecture according to an embodiment of the disclosure. Referring to FIG. 2A, in the architecture, the sequence of a data flow 201 is that the controller 150 accesses data from the memory 110 and transfers the data to the computing unit 130, and the computing unit 130 stores the computed result (via a cache 170) to the memory 110.

Figure 2B:
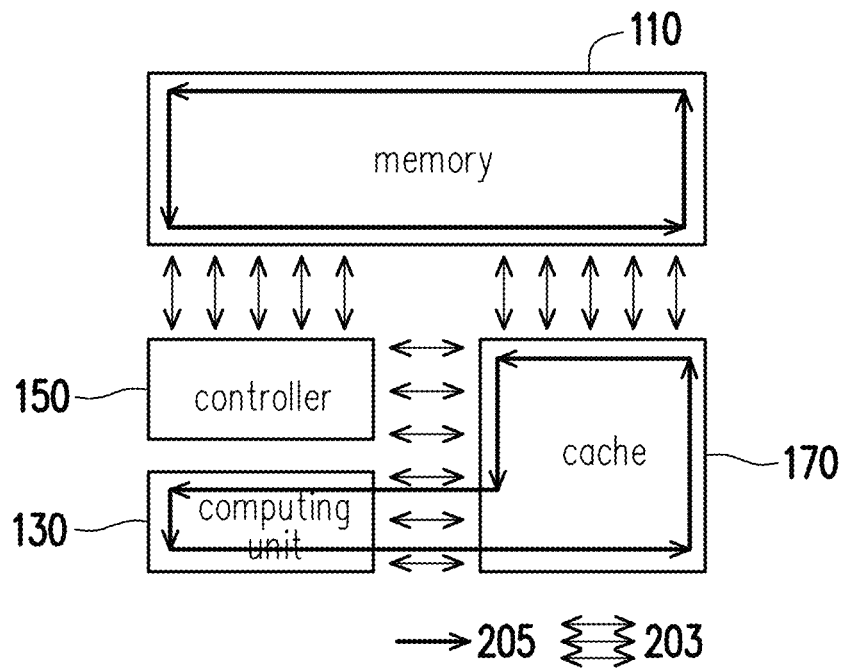
FIG. 2B is a schematic view of an in-memory computing architecture according to an embodiment of the disclosure.

In one embodiment, the data processing circuit is an in-memory computing architecture. FIG. 2B is a schematic view of an in-memory computing architecture according to an embodiment of the disclosure. Referring to FIG. 2B, a bus connected to a data flow 205 f the architecture is the same as that of the von Neumann architecture. However, what is different from the von Neumann architecture is that a data flow 203 is transmitted inside the memory 110.

Note that in the embodiment of the disclosure, the von Neumann architecture is combined with the in-memory computing architecture.

In the subsequent paragraphs, various elements or circuits in the data processing circuit 100 are used to illustrate the method according to the embodiment of the disclosure. Each process of the method can be adjusted accordingly according to the actual implementation, and the disclosure is not limited thereto.

Figure 3:
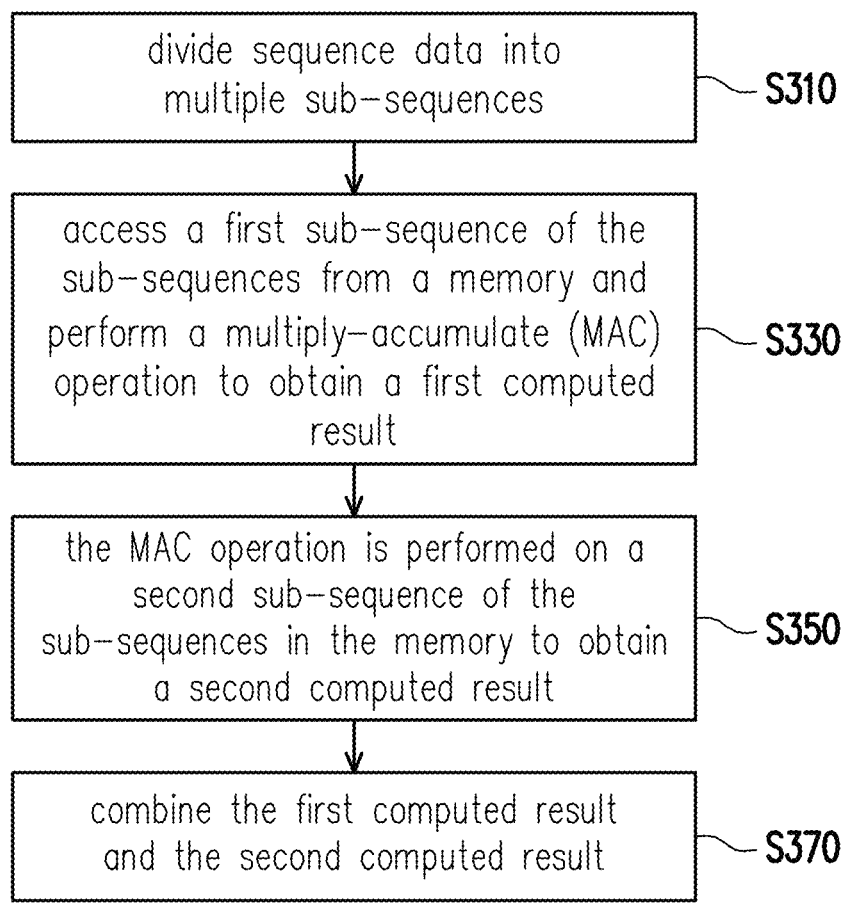
FIG. 3 is a flowchart of a fault-mitigating method according to an embodiment of the disclosure.

FIG. 3 is a flowchart of a fault-mitigating method according to an embodiment of the disclosure. Referring to FIG. 3, the controller 150 divides the sequence data into multiple sub-sequences (step S310). Specifically, for example, the sequence data is images, voices, sensing data; data related to other application fields (e.g., the grayscale value, feature value, intensity value of a pixel, or the like.); the weight used in the MAC operation; or binary or other hexadecimal values used in the activation. The values in the sequence data are sorted according to specific rules (e.g., a pixel position, a convolution kernel definition position, an operation sequence, or the like). The sequence data is stored in one or more memory blocks of the memory 110.

Note that in the conventional in-memory computing architecture, for MAC operations, the MAC operations of all bits of the input sequence and the weight sequence are all completed in the memory. For example, the MAC operation of 8-bit input and 8-bit weight is a direct 8-bit to 8-bit operation. However, according to experiments, for convolutional neural networks (CNN), after convolution operations are performed, faults/damages/errors may seriously affect the image recognition results. For example, if a fault occurs in a higher bit, the recognition success rate may be close to zero.

Based on the above, the embodiment of the disclosure can divide the sequence data into multiple sub-sequences and allocate them to the von Neumann architecture and the in-memory computing architecture to implement each operation of the sub-sequences. For example, the division method is that the sequence data is 8 bits, then one sub-sequence is the 0th to the 3rd bits in the sequence data, and the other sub-sequence is the 4th to the 7th bits in the sequence data. For example, if the sequence data is 16 bits, one sub-sequence is the 0th to the 5th bits in the sequence data, another sub-sequence is the 6th to the 9th bits in the sequence data, and another sub-sequence is the 10th to 15th bits in the sequence data. For example, if the sequence data is 32 bits, one sub-sequence is the 0th to the 16th bits in the sequence data, and the other sub-sequence is the 10th to the 31st bits in the sequence data. In other words, the sub-sequences are part of the sequence data. The content of different sub-sequences may be in different or the same bit positions in the sequence data, and different bit positions are allocated depending on the division method.

In one embodiment, the controller 150 divides the sequence data into a high bit group and a low bit group according to the division relationship of the MAC operation. The division relationship is related to the division of the MAC operations into multiple operations.

Figure 4A:
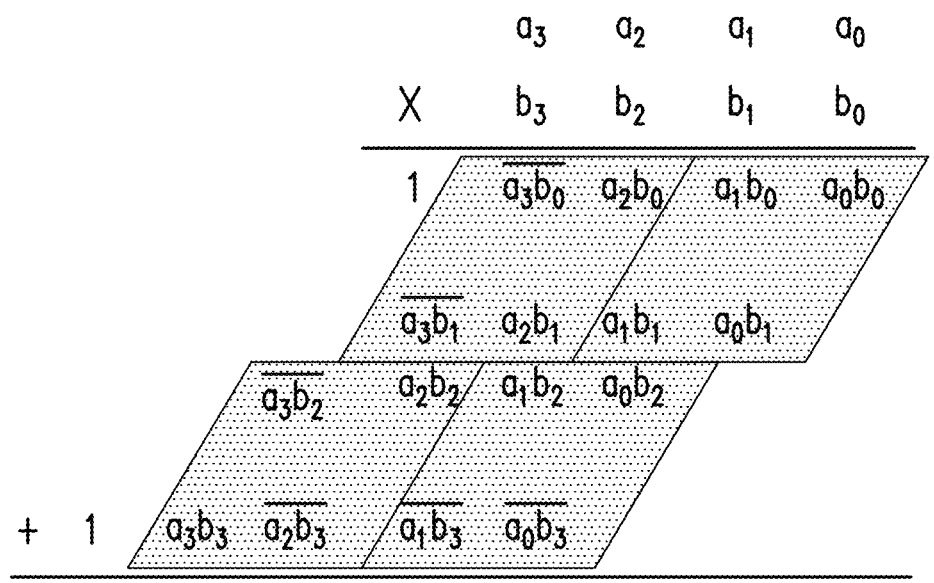
FIG. 4A is a schematic view of a 4-bit×4-bit multiply-accumulate (MAC) operation according to an embodiment of the disclosure.
Figure 4B:
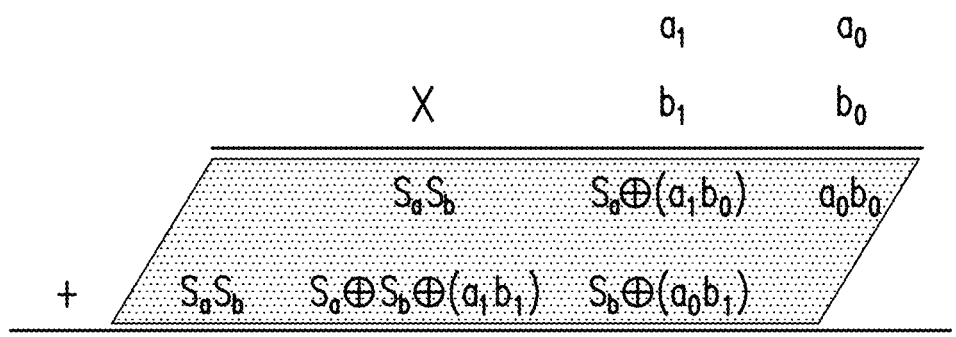
FIG. 4B is a schematic view of a sub-operation of 2 bits×2 bits according to an embodiment of the disclosure.

For example, FIG. 4A is a schematic view of a 4-bit×4-bit multiply-accumulate (MAC) operation according to an embodiment of the disclosure. Referring to FIG. 4A, assuming that the input is composed of bits a0 to a3, and the weight is composed of bits b0 to b3, the signed MAC operation is illustrated in the figure. For example, "a0b0" represents the multiplication of bits a0 and b0, and so on. FIG. 4B is a schematic view of a sub-operation of 2 bits×2 bits according to an embodiment of the disclosure. Referring to FIG. 4B, note that if the signed MAC operation is performed on the input and the weight of low bit (e.g., bits a0, a1, b0, and b1), the signed Sa and Sb of the input and weight need to be further considered.

According to the examples in FIG. 4A and FIG. 4B, the result of the 4-bit×4-bit MAC operation is the result of the multiplication of the products of different bit groups (e.g., 2 bits×2 bits) and the products of some shifted bit groups. However, the sub-operation in the embodiment of the disclosure is an operation (still the MAC operation) with fewer bits than the MAC operation. For example, the MAC operation is 16 bits×16 bits, and the sub-operation is 12 bits×12 bits.

On the other hand, the sum of the number of bits of the high bit group and the low bit group divided from the sequence data is equal to the number of the sequence data. The low bit group has a lower position in the sequence data than the high bit group. That is, the low bit group is the lower bit weight in the binary, and the high bit group is the higher bit weight in the binary. For example, if the sequence data is 8 bits, the high bit group is the 5th to the 7th bits in the sequence data, and the low bit group is the 0th to the 4th bits in the sequence data.

In one embodiment, the bit ratio in the high bit group and the low bit group is related to the neural network applied to the sequence data. The neural network module can be any version of Inception, ResNet, AlexNet, SqueezeNet, or other models. For example, the bit ratio of Inception V1 is that the number of bits in the high bit group is greater than the number of bits in the low bit group. For example, if the sequence data is 28 bits, the high bit group is the 10th to the 27th bits of the sequence data, and the low bit group is the 0th to the 9th bits of the sequence data.

In another embodiment, the bit ratio in the high bit group and the low bit group may also be determined by random numbers or based on other rules.

In some embodiments, the sequence data is not limited to being divided into two sub-sequences (e.g., the high bit group and the low bit group) and may include more sub-sequences. For example, the sequence data is divided into four sub-sequences.

The controller 150 accesses the first sub-sequence of the sub-sequences from the memory 110 and performs the MAC operation to obtain the first computed result (step S330). Specifically, the controller 150 accesses the first sub-sequence of the sub-sequences from the memory 110, and the computing unit 130 performs the MAC operation on the first sub-sequence to obtain the first computed result. Referring to the von Neumann architecture shown in FIG. 2A, for the input, the weight, or other data to be computed by the computing unit 130, the controller 150 may access the data from the memory 110 and transfer the data to the computing unit 130. Compared to the conventional technique of directly accessing the entire sequence data, in the embodiment of the disclosure, only part of the data (i.e., sub-sequence) of the sequence data is accessed.

On the other hand, the MAC operation is performed on the second sub-sequence of the sub-sequences in the memory 110 to obtain the second computed result (step S350). In other words, the MAC operation is performed on the second sub-sequence of the sub-sequences in the memory 110 to obtain the second computed result. Referring to the in-memory computing architecture shown in FIG. 2B, the memory 110 can directly perform the MAC operations on the input, the weight, or other data. In other words, part of the data (i.e., the sub-sequences) in the sequence data are computed by the memory 110, but not all data is computed by the memory 110.

In one embodiment, if the sequence data is divided into a high bit group and a low bit group, the first sub-sequence is the high bit group, and the second sequence is the low bit group. That is, the high bit group is computed by the computing unit 130, and the low bit group is computed by the memory 110. Taking inception V1 as an example, assuming that the integer part of the sequence data has 14 bits, and the fractional part has 14 bits, the first sub-sequence is the 10th to the 27th bits in the sequence data, and the second sub-sequence is the 0th to the 9th bits in the sequence data. Moreover, assuming that the integer part of the sequence data has 16 bits, and the fractional part has 16 bits, the first sub-sequence is the 13th to the 15th bits in the sequence data, and the second sub-sequence is the 0th to the 12th bits in the sequence data.

In another embodiment, the first sub-sequence may also be the low bit group, and the second sequence may be the high bit group. In some embodiments, the position of the first sub-sequence or the position of the second sub-sequence in the sequence data is not limited to the low bit group or the high bit group. Taking 16-bit sequence data as an example, the first sub-sequence is the 2nd to the 5th bits in the sequence data, and the second sub-sequence is the 7th to the 13th bits in the sequence data.

Figure 5:
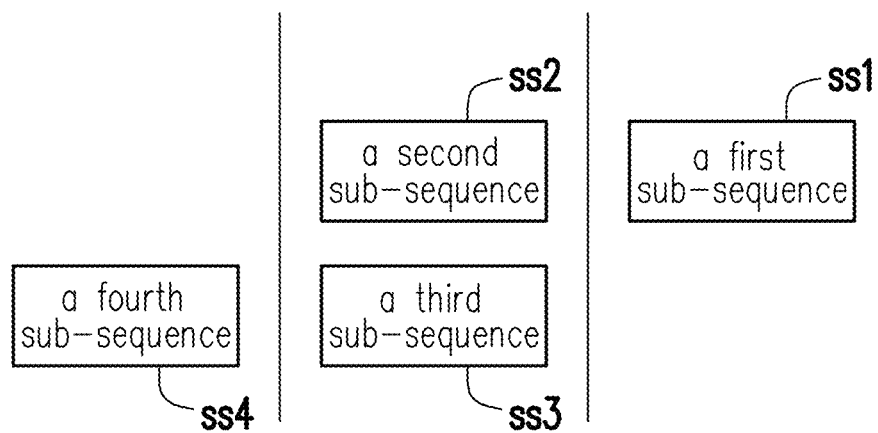
FIG. 5 is a schematic view of a pipeline stage according to an embodiment of the disclosure.

FIG. 5 is a schematic view of a pipeline stage according to an embodiment of the disclosure. Referring to FIG. 5, in an embodiment, the MAC operations of a first sub-sequence ss1 and a second sub-sequence ss2 are performed in a single pipeline stage. In other words, the MAC operations of the first sub-sequence ss1 and the second sub-sequence ss2 can be processed in parallel/simultaneously. The first sub-sequence ss1 and the second sub-sequence ss2 are computed by the memory 110 and the computing unit 130, respectively, the two MAC operations can be realized in a single pipeline stage. Moreover, a third sub-sequence ss3 and a fourth sub-sequence ss4 divided from the next sequence data may also be computed by the memory 110 and the computing unit 130 respectively and simultaneously.

In one embodiment, the MAC operations of the first sub-sequence ss1 and the second sub-sequence ss2 can also be performed in different stages.

The computing unit 130 or the memory 110 combines the first computed result and the second computed result (step S370). Specifically, the combined result of the first computed result and the second computed result is related to the result of the MAC operation on the sequence data directly. For example, if the first computed result is for the high bit group, and the second computed result is for the low bit group, the first computed result can be shifted and then added to the first computed result, and the computed result is equal to the result of the MAC operation on the sequence data directly. Note that based on different division methods, the combination of the first and second computed results may be different. For example, the number of bits of the shifted computed result is different.

For example, if the input is [7 6] and the weight is [1 2]^T, the matrix multiplication of the input and the weight can be decomposed into 7×1 (binary is 0111×01) and 6×2 (binary is 0110×10). 0111×01 can be further decomposed into 01×01 and 11×01 (i.e., the sub-operations), and 0110×10 can be further decomposed into 01×10 and 10×10 (i.e., the sub-operations). Meanwhile, 11×01 and 10×10 can be computed by the memory 110, and 01×01 and 01×10 can be computed by the computing unit 130. Finally, the computed results of 01×01 and 01×10 need to be shifted by two bits to the high bit and then added to 11×01 and 10×10, and the result of the matrix multiplication of the [7 6] and the [1 2]^T can be obtained similarly.

Figure 6:
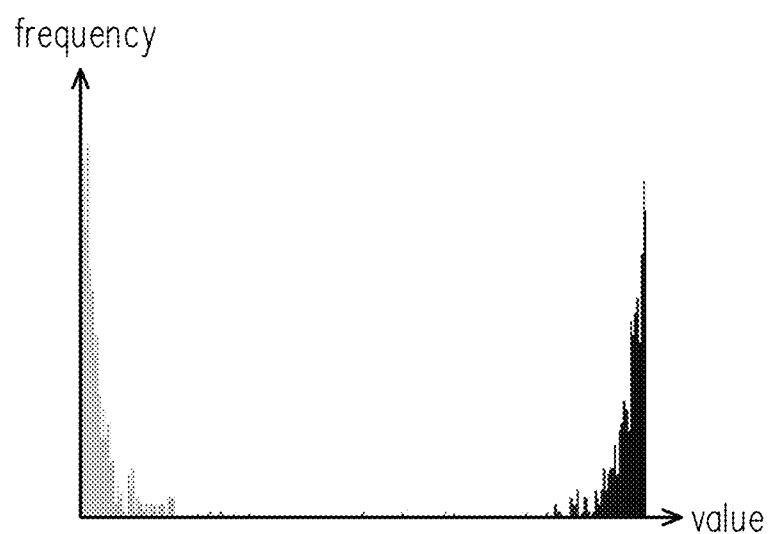
FIG. 6 is a schematic view of a value distribution according to an embodiment of the disclosure.

In one embodiment, the value of the sequence data is first calibrated to form a value distribution. The value distribution indicates a higher frequency of occurrence in the part with higher values and/or in the part with lower values. For example, FIG. 6 is a schematic view of a value distribution according to an embodiment of the disclosure. Referring to FIG. 6, the higher the value or the lower the value, the higher the frequency of occurrence.

In one embodiment, the computing unit 130 may determine the length of the first sub-sequence according to a difference between an error-free value and an error-injected value outputted from a computing layer of a neural network by inputting a data sample with a simulated error. The neural network could be any version of Inception, GoogleNet, ResNet, AlexNet, SqueezeNet, or another model. As aforementioned bit ratio, different neural networks may be adapted for different bit ratios. The bit ratio would be determined based on the length of the first sub-sequence. In the calibration stage, the computing unit 130 would determine which length are adapted for the neural network used with the multiply-accumulate operation.

Figure 7:
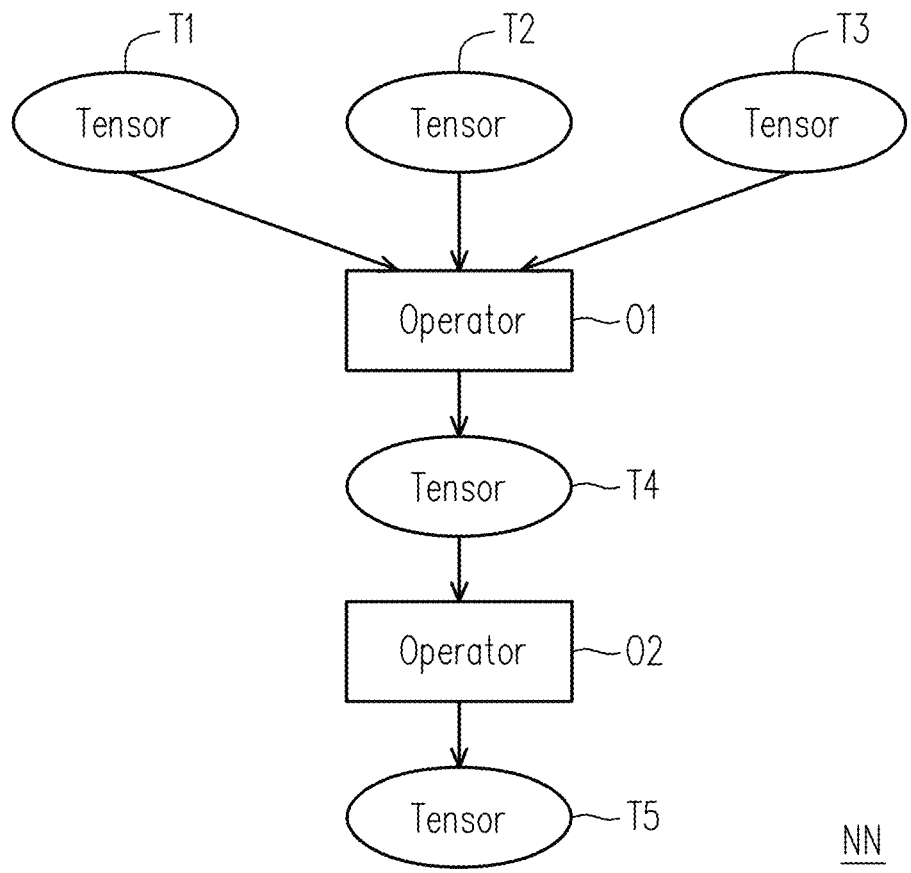
FIG. 7 is a schematic view of a neural network structure according to an embodiment of the disclosure.

The neural network may include one or more computing layers. The computing layer may be a convolution layer, an activation layer, or another layer related to a neural network. For example, FIG. 7 is a schematic view of a neural network structure NN according to an embodiment of the disclosure. Referring to FIG. 7, the neural network structure NN includes two operators O1 and O2 which are respectively corresponding to a convonlution layer and an activation layer (i.e., the computing layers). The operator O1 includes three input parameters (i.e., tensors T1~T3, or called feature maps) and one output parameter (i.e., tensor T4). The operator O2 has one input parameter (i.e., tensor T4) and one output parameter (i.e., tensor T5).

If tensors T1~T4 are stored in a memory with fault bits, the final predicted result of the neural network may be affected. It should be noticed that computing unit 130 may make a simulation (called simulated error hereinafter) that a fault bit is located in each bit of the data sample. The computing unit 130 inputs the data sample with the simulated error into the neural network, to output an error-injected value. Furthermore, the computing unit 130 compares the error-free value and the error-injected value outputted from one or more computing layers of the neural network, to generate the difference between the error-free value and the error-injected value. The error-free value is the corrected value outputted from the computing layers of the neural network without any fault bit. The difference between the error-free value and the error-injected value may be determined based on mean-square-error (MSE), root-mean-square error (RMSE), least-mean-square error (LMSE), cosine similarity, or another error related function.

Figure 8:
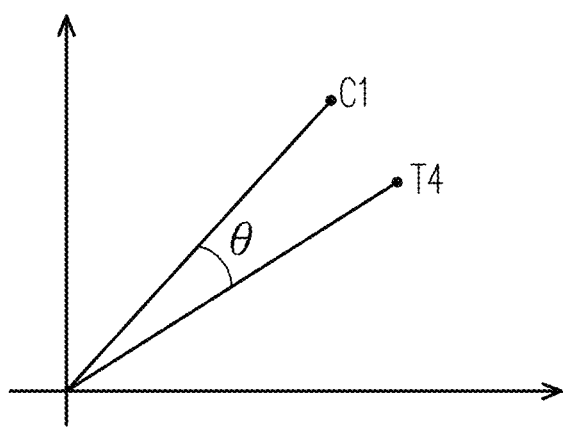
FIG. 8 is a schematic view of a neural network structure according to an embodiment of the disclosure.

Taking cosine similarity as an example, FIG. 8 is a schematic view of a neural network structure according to an embodiment of the disclosure. Referring to FIG. 8, it is assumed that an included angle θ is formed between the vector A of the error-free value C1 and the vector B of the tensor T4 of FIG. 7, and its mathematical function is:

$$\cos(\theta) = \frac{A \cdot B}{\|A\| \times \|B\|} = \frac{\sum_{i=1}^{m} A_i \times B_i}{\sqrt{\sum_{i=1}^{m} A_i^2} \times \sqrt{\sum_{i=1}^{m} B_i^2}} \quad (1)$$

where $\cos(\theta)$ is the cosine similarity of two vectors A and B, $A_i$ is the i-th element in the vector A, $B_i$ is the i-th element in the vector B, m is the total amount of all elements in the vectors A and B. If $\cos(\theta)$ is equal to 1, the difference between the error-free value and the error-injected value is the least. If $\cos(\theta)$ is equal to $-1$, the difference between the error-free value and the error-injected value is the most. If $\cos(\theta)$ is between $-1$ to 1, the difference is located between the least difference and the most difference.

In one embodiment, the computing unit 130 may compare the difference between the error-free value and the error-injected value with a difference threshold, to generate a compared result. The difference threshold is related to an allowable error rate of the predicted result of the neural network. The computing unit 130 may determine the length of the first sub-sequence according to the compared result. If the compared result is that the difference between the error-free value and the error-injected value is greater than the difference threshold, the controller 150 would determine that the position where the fault bit is located in the data sample would be used to determine that the same position having the fault bit in the data sequence should take the computing in memory (CIM) manner on the MAC operation, and the same position is the position of the second sub-sequence. If the compared result is that the difference between the error-free value and the error-injected value is less than the difference threshold, the controller 150 would determine that the position where the fault bit is located in the data sample would be used to determine that the same position having the fault bit in the data sequence should be calculated by the computing unit 150 on the MAC operation, and the same position is the position of the first sub-sequence, so as to determine the length of the first sub-sequence. Then, the controller 150 may use the length of the first sub-sequence to divide multiple sub-sequences into the first sub-sequence and the second sub-sequence.

Taking Inception as an example, if all sub-sequences in sequence data with 10 bits are calculated by the computing unit 130 for MAC operation, the cosine similarity is 0.99. If the 3-bit sub-sequence is calculated in memory 110 and the 7-bit sub-sequence is calculated by the computing unit 130 for MAC operation, the cosine similarity is 0.806. If 4-bit sub-sequence is calculated in memory 110 and 6-bit sub-sequence is calculated by the computing unit 130 for MAC operation, the cosine similarity is 0.506. Therefore, the length of the first subsequence could be 7 bits.

Based on the above, in the data processing circuit and the fault-mitigating method of the embodiment in the disclosure, part of the data (i.e., the sub-sequences) in the sequence data respectively are computed by the computing unit and the memory. For example, the low bit group in the sequence data is computed by the memory, and the high bit group is computed by the computing unit. Accordingly, compared to the in-memory computation, the error rate can be reduced, so as to mitigate fault.

Although the disclosure has been described with reference to the above embodiments, it will be apparent to one of ordinary skill in the art that modifications to the described embodiments may be made without departing from the spirit and the scope of the disclosure. of the disclosure will be defined by the attached claims and their equivalents and not by the above detailed descriptions.

What is claimed is:

1. A fault-mitigating method, comprising:
   dividing sequence data into a plurality of sub-sequences;
   accessing a first sub-sequence of the plurality of the sub-sequences from a memory to perform a multiply-accumulate (MAC) operation to obtain a first computed result;
   performing the multiply-accumulate operation on a second sub-sequence of the plurality of the sub-sequences in the memory to obtain a second computed result; and
   combining the first computed result and the second computed result, wherein a combined result of the first computed result and the second computed result is related to a result of the multiply-accumulate (MAC) operation on the sequence data directly, wherein dividing sequence data into the plurality of sub-sequences comprises:

determining a length of the first sub-sequence according to a difference between a error-free value and an error-injected value outputted from a computing layer of a neural network by inputting a data sample with a simulated error, wherein the simulated error is a simulation that a fault bit is located in the data sample; and using the length of the first sub-sequence to divide the plurality of sub-sequences into the first sub-sequence and the second sub-sequence.

2. The fault-mitigating method according to claim 1, wherein the step of dividing the sequence data into the plurality of the sub-sequences comprises:

dividing the sequence data into a high bit group and a low bit group according to a division relationship of the multiply-accumulate operation, wherein the division relationship is related to the multiply-accumulate operation being divided into a plurality of operations, a sum of a number of bits of the high bit group and a number of bits of the low bit group is equal to the sequence data, the first sub-sequence is the high bit group, and the second sub-sequence is the low bit group.

3. The fault-mitigating method according to claim 2, wherein a bit ratio of the high bit group and the low bit group is related to a neural network applied to the sequence data.

4. The fault-mitigating method according to claim 1, wherein the multiply-accumulate operations of the first sub-sequence and the second sub-sequence are performed in a single pipeline stage.

5. The fault-mitigating method according to claim 1, wherein determining the length of the first sub-sequence comprises:

comparing the difference with a difference threshold, to generate a compared result; and determining the length of the first sub-sequence according to the compared result.

6. A data processing circuit, comprising:

a memory for storing sequence data;

a controller coupled to the memory and adapted to divide the sequence data into a plurality of sub-sequences; and a computing unit coupled to the memory and the controller, wherein the controller accesses a first sub-sequence of the plurality of the sub-sequences from the memory, and the computing unit performs a multiply-accumulate operation on the first sub-sequence to obtain a first computed result;

the multiply-accumulate operation is performed on a second sub-sequence of the plurality of the sub-sequences in the memory to obtain a second computed result; and the computing unit or the memory combines the first computed result and the second computed result, wherein a combined result of the first computed result and the second computed result is related to a result of the multiply-accumulate (MAC) operation on the sequence data directly, wherein the computing unit determines a length of the first sub-sequence according to a difference between an error-free value and an error-injected value outputted from a computing layer of a neural network by inputting a data sample with a simulated error, and the controller uses the length of the first sub-sequence to divide the plurality of sub-sequences into the first sub-sequence and the second sub-sequence, and the simulated error is a simulation that a fault bit is located in the data sample.

7. The data processing circuit according to claim 6, wherein the controller divides the sequence data into a high bit group and a low bit group according to a division relationship of the multiply-accumulate operation, the division relationship is related to the multiply-accumulate operation being divided into a plurality of operations, a sum of a number of bits of the high bit group and a number of bits of the low bit group is equal to the sequence data, the first sub-sequence is the high bit group, and the second sequence is the low bit group.

8. The data processing circuit according to claim 7, wherein a bit ratio of the high bit group and the low bit group is related to a neural network applied to the sequence data.

9. The data processing circuit according to claim 6, wherein the multiply-accumulate operations of the first sub-sequence and the second sub-sequence are performed in a single pipeline stage.

10. The data processing circuit according to claim 6, wherein the computing unit compares the difference with a difference threshold, to generate a compared result, and the computing unit determines the length of the first sub-sequence according to the compared result.

* * * * *